(12) United States Patent
Lee et al.

(10) Patent No.: US 8,001,387 B2
(45) Date of Patent: Aug. 16, 2011

(54) REMOVABLE STORAGE MEDIUM WITH BIOMETRIC ACCESS

(75) Inventors: Lane W. Lee, Boulder, CO (US); Mark J. Gurkowski, Longmont, CO (US); David H. Davies, Boulder, CO (US)

(73) Assignee: DPHI, Inc., Longmont, CO (US)

( * ) Notice: Subject to any disclaimer, the term of this patent is extended or adjusted under 35 U.S.C. 154(b) by 1152 days.

(21) Appl. No.: 11/407,467

(22) Filed: Apr. 19, 2006

(65) Prior Publication Data

US 2007/0250718 A1    Oct. 25, 2007

(51) Int. Cl.
*G06F 21/00* (2006.01)
*G06F 7/04* (2006.01)
*G06F 12/00* (2006.01)
*G06F 12/14* (2006.01)
*G06F 13/00* (2006.01)

(52) U.S. Cl. ............ 713/186; 713/165; 726/18; 726/33; 380/45

(58) Field of Classification Search .................. 713/186, 713/165; 726/18, 33; 380/45
See application file for complete search history.

(56) References Cited

U.S. PATENT DOCUMENTS

| | | | | |
|---|---|---|---|---|
| 5,949,877 A * | 9/1999 | Traw et al. ..................... 713/171 |
| 6,636,966 B1 * | 10/2003 | Lee et al. ...................... 713/165 |
| 6,832,319 B1 * | 12/2004 | Bell et al. ...................... 713/193 |
| 7,114,168 B1 * | 9/2006 | Wyatt et al. ..................... 725/31 |
| 2002/0046336 A1 * | 4/2002 | Kon et al. ..................... 713/156 |
| 2002/0101816 A1 * | 8/2002 | Braitberg et al. ............. 369/291 |
| 2002/0184509 A1 * | 12/2002 | Scheidt et al. ................ 713/185 |
| 2003/0088782 A1 * | 5/2003 | Forrest .......................... 713/186 |
| 2004/0151312 A1 * | 8/2004 | Yanagisawa ................... 380/45 |
| 2005/0244037 A1 * | 11/2005 | Chiu et al. .................... 382/124 |

OTHER PUBLICATIONS

S. Pankanti, R. M. Bolle, and A. Jain, "Biometrics: The Future of Identification," Computer, vol. 33, No. 2, Feb. 2000, pp. 46-49.*
Foldoc. "Flash Erasable Programmable Read-Only Memory", 1995.*

* cited by examiner

*Primary Examiner* — Michael Simitoski
(74) *Attorney, Agent, or Firm* — Haynes & Boone, LLP.

(57) ABSTRACT

In one embodiment, a storage device with biometric access includes: a biometric scanner adapted to scan a biological feature of a user to provide a corresponding extracted biometric template; and a storage engine adapted to retrieve an encrypted biometric template from a storage medium and to retrieve a corresponding encrypted content key from the storage medium. The storage engine generates a first key and combines the first key with a media identifier from the storage medium to provide a content key. Using the content key, the storage engine decrypts the retrieved encrypted biometric template. If the extracted biometric template matches the retrieved biometric template, the storage engine grants a user access to content on the storage medium.

18 Claims, 2 Drawing Sheets

REMOVABLE STORAGE MEDIUM WITH BIOMETRIC ACCESS

TECHNICAL FIELD

The present invention relates generally to digital rights management. More particularly, the present invention relates to the access of storage medium through biometric scanning.

BACKGROUND

Developments in the field of digital rights management (DRM) have accelerated as the proliferation of peer-to-peer file sharing services on the Internet exacerbate the conflict between digital content creators and digital content users. Much digital content such as financial records or medical records is extremely private yet has to be shared with the appropriate users. Transmission of such private digital content over the Internet is problematic even when the content is encrypted given the ever-increasing skills of "hackers."

Once in possession of digital content, a consumer will often act as if he or she has full rights to this digital content. However, the content provider often retains copyright protection and privacy concerns over the digital content that is violated by certain actions of the user—for example, when the user allows unauthorized third parties to freely copy this digital content via a file sharing program.

To address this inherent conflict between users and providers of digital content, a variety of Digital Rights Management (DRM) systems have been implemented. For example, a commonplace scenario involves a user on a host system such as a personal computer accessing content through the Internet. Upon receipt of digital content, the host system must have some type of storage engine such as a hard disk drive to store the content on a storage medium (for example, a magnetic storage hard disk). A typical location for a DRM system in such an environment is in the operating system of the host. But this location is inherently vulnerable to hacking by a user bent upon violating the copyright/privacy rights of the content provider. Thus, there has been a need in the art for DRM systems that provide greater security for content providers. At the same time, however, a DRM system should not impact the legitimate expectations of users in regard to fair use of the digital content.

To address the need in the art for a DRM system that meets both user and content provider expectations, U.S. Pat. No. 6,636,966, entitled "Digital Rights Management Within an Embedded Storage Device," U.S. application Ser. No. 09/583,452, entitled "Method of Decrypting Data Stored on a Storage Device Using an Embedded Encryption/Decryption Means," filed May 31, 2000, U.S. Serial application Ser. No. 09/940,026, entitled "Host Certification Method and System," filed Aug. 27, 2001, U.S. Serial application Ser. No. 09/940,083, entitled "A Secure Access Method and System," filed Aug. 27, 2001, describe a DRM system in which the DRM "intelligence" has been integrated into the storage engine. As opposed to conventional DRM systems that reside on the host, the integrated storage engine approach is far less vulnerable to hacking by a user of a host system—the user has no access to the DRM functionality within the storage engine other than through the reading or writing of secure content from the storage medium associated with the storage engine. The user knows that digital content may flow to and from the data storage medium but cannot access the "how" within the storage engine that enabled such movement.

Despite the advances described above with respect to DRM-system-integrated storage engines, there remains a need in the art for improvements in the DRM field with respect to protecting confidential information such as financial records or medical records.

SUMMARY

In accordance with one aspect of the invention, a storage device with biometric access is provided that includes: a biometric scanner adapted to scan a biological feature of a user to provide a corresponding extracted biometric template; and a storage engine adapted to retrieve an encrypted biometric template from a storage medium and to retrieve a corresponding encrypted content key from the storage medium; generate a first key; generate at least one combination key by combining the first key with a media identifier from the storage medium; decrypt the encrypted content key using the combination key to recover a content key; decrypt the retrieved encrypted biometric template using the content key to recover a retrieved biometric template; and allow a host device access to content on the storage medium if the extracted biometric template matches the retrieved biometric template.

In accordance with another aspect of the invention, a method is provided that includes the acts of: generating a first key; combining the first key with a media identifier from a storage medium to create a content key within a storage engine; encrypting a first biometric template with the content key; writing the encrypted first biometric template to the storage medium using the storage engine;
scanning a biometric feature with a biometric scanner to provide an extracted biometric template; retrieving the encrypted biometric template from the storage medium; decrypting the encrypted biometric template with the combination key to recover the first biometric template; and allowing a user access to content on the storage medium if the extracted biometric template matches the first biometric template.

These and other aspects of the invention will become more apparent from the following drawings and description.

DETAILED DESCRIPTION

The present invention provides a digital rights management (DRM) system for storage devices employing a biometric scanner. As used herein, a "biometric scanner" refers to any device that reads a biological pattern unique to an individual. For example, a fingerprint scanner, an iris scanner, and genetic analyzers represent various embodiments of suitable biometric scanners for the present invention. Because fingerprint scanners are convenient to use and fairly compact, the following discussion will assume that the disclosed storage engine is associated with a fingerprint scanner. However, it will be appreciated that other forms of biometric scanners may be used.

Figure 1:
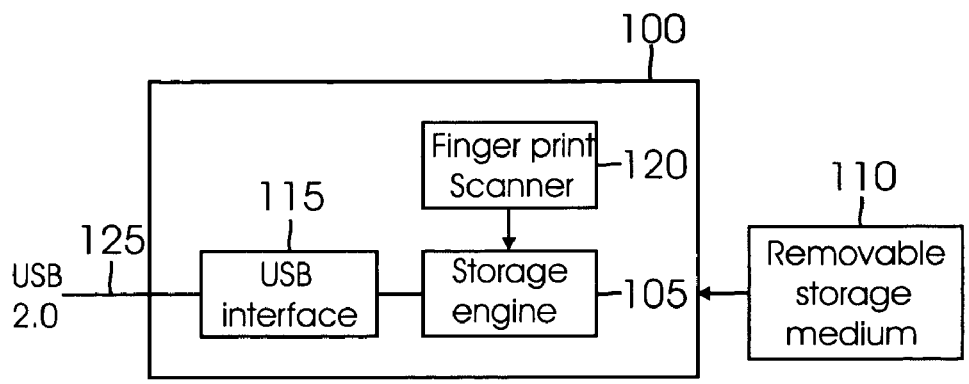
FIG. 1 is a block diagram for a storage device with biometric access according to an embodiment of the invention.

Turning now to FIG. 1, an overview of a biometric-access storage device 100 is illustrated. The device includes a storage engine 105 adapted to read and write to a storage medium 110. For example, the storage engine may be an optical disk drive such that the storage medium is an optical disk. Alternatively, the storage engine may be a magnetic disk drive such that the storage medium is a magnetic disk. In yet another embodiment, the storage engine may be a memory drive such that the storage medium is removable flash or EEPROM. The storage engine interfaces to a host device (such as a PC or laptop) through an appropriate interface, e.g., a 2.0 USB interface 115.

The removable storage medium stores biometric templates that are retrieved by the storage engine. To read or write content to the storage medium, a user swipes his or her finger on a fingerprint scanner 120. If the user's fingerprint matches a stored biometric template, the storage device interfaces as a conventional USB drive to a PC user coupled to the USB interface over a USB cable such as a USB 2.0 cable 125. For example, a user may be presented with a directory of content on the disk and then select the desired file from this directory.

To provide enhanced security, both the biometric templates and any content on the storage medium are encrypted by the storage engine 105. In this fashion, the DRM is storage-engine-based rather than host-based. In a host-based DRM system, the host (typically a PC or laptop) controls the encryption and decryption of content. Such a location for the DRM encryption/decryption is inherently vulnerable to hackers. However, in the storage device of FIG. 1, the storage engine controls the desired encryption and decryption of both content and its associated metadata (encryption keys). A host has no access to the encryption schemes within the storage engine and thus is relatively powerless to hack into these schemes.

The biometric access scheme builds upon the DRM developments disclosed in previously-mentioned references. For example, the storage engine may include a pseudo-random number generator such as a linear feedback shift register. A first seed to this generator is stored, e.g., in non-volatile memory such as flash or EEPROM which may be integrated with an ASIC incorporating the generator. In this fashion, even if someone were to reverse-engineer (at considerable expense) the ASIC to examine the generator topology, the first seed to the generator remains inaccessible. In addition, a second type of seed may be derived by, e.g., examining the output of an analog-to-digital converter in the storage engine when no storage medium is being examined. Because the second type of seed is thus a sample of random noise, this seed will be a random number rather than a pseudo-random number. When such a seed is provided to a linear feedback shift register, a truly random rather than a pseudo-random number is generated.

In this fashion, the second seed may be used to generate random encryption keys. For example, the storage engine may be adapted to practice a Data Encryption Standard (DES) algorithm. This encryption may occur using single, double, or triple DES encryption. As will described further herein, a user initializes a storage medium by writing the desired biometric templates to the medium. Each user who possesses a biological feature that may be scanned to produce a matching biometric template will be granted access to the storage medium. For enhanced security, the biometric templates are encrypted by the storage engine using, for example, triple DES encryption before they are written to the storage medium.

The storage engine may write the associated encryption keys (for example, the triple DES keys if triple DES encryption is implemented) to a secure metadata area of the storage medium. For example, the storage engine may emulate a File Allocation Table 16 (FAT 16) file system to the host. The host is thus presented with a certain amount of "logical block addresses" in which content may be stored. In one embodiment, the storage engine writes the metadata to a logical block address outside the range presented to the host so that the host has no access to this metadata. In addition to this level of protection, the storage engine may tie the metadata to the storage medium as discussed, for example, in U.S. application Ser. No. 09/583,452. To tie the metadata to the medium, the storage medium should have a unique media identifier such as a serial number. The storage engine may use the first seed to generate a pseudo-random number as discussed previously. Thus, the pseudo-random number may be re-generated in a secure yet predictable fashion. The resulting pseudo-random number is combined (for example, through a hashing algorithm) with the unique media identifier to create a combination key. This combination key may then be used to encrypt the encryption key(s) before they are written to the metadata area of the storage medium using, for example, triple DES encryption. The metadata area of the storage medium thus includes encrypted encryption key(s). In addition, the encrypted biometric templates may be written to the metadata area.

To decrypt the encrypted encryption key(s), the storage engine reads the media identifier and generates the pseudo-random number. The storage engine may then create the combination key by combining the pseudo-random number and the media identifier using the appropriate algorithm. Having possession of the combination key, the storage engine may then decrypt the encrypted encryption key(s). The decrypted encryption keys may also be denoted as content keys because they function to decrypt the content such as the biometric templates stored on the storage medium. Advantageously, the encryption keys are thus tied to the storage medium in that any storage engine configured with the first seed and the pseudo-random number generator may generate the pseudo-random number and read the media identifier from the storage medium so as to generate the combination key. In this fashion, the implemented digital rights management satisfies user expectations in that the storage medium may be used in a plurality of storage engines just as a DVD may be played in any DVD player a user may have available. Moreover, a third party cannot simply make a bit-for-bit copy of the storage medium to clone the content on the storage medium because the encryption keys are tied to the original storage medium's unique media identifier. In addition, because the generation of the pseudo-random number may take place in an ASIC, the generation of this number is quite secure.

It may be seen that this DRM scheme may be generalized such that the storage engine generates a first key. This first key may be a pseudo-random number or be some other secure but repeatable digital word. Having generated the first key, the storage engine creates a combination key through algorithmic combination with the media identifier to either encrypt or decrypt the encryption key(s). Preferably, the encryption/decryption of the encryption keys is reflexive in that the same combination key is used for both procedures. However, in alternative embodiments, non-reflexive encryption/decryption of the encryption keys may be practiced.

Having a storage medium initialized with the desired templates, a user may then insert the medium into the storage engine and scan their fingerprint. Because of day-to-day variations in skin dryness, abrasions, orientation to the scanner, and other factors, a fingerprint will rarely scan into precisely the same bit-for-bit biometric template. Thus, a biometric match decision requires an analysis of a scanned biometric template to determine if the scanned template is sufficiently similar to a stored template so as to declare a match. In contrast, typical password decisions in a DRM schemes require an exact match. The logic resources necessary to perform the biometric match analysis may be located in either the scanner or the storage engine. Once a match has been declared, the corresponding host coupled to the storage device has full access to the data content (but not the metadata) on the storage medium. In this fashion, a host PC or laptop need not have any specialized software other than that necessary to support the file system being practiced by the storage device. As discussed above, a convenient file system is FAT16 because it is so widely supported by host devices. Regardless of the file system being implemented, once a user has provided a matching biometric template, that user's host may interface with the storage device using the protocol appropriate to that file system.

Figure 2:
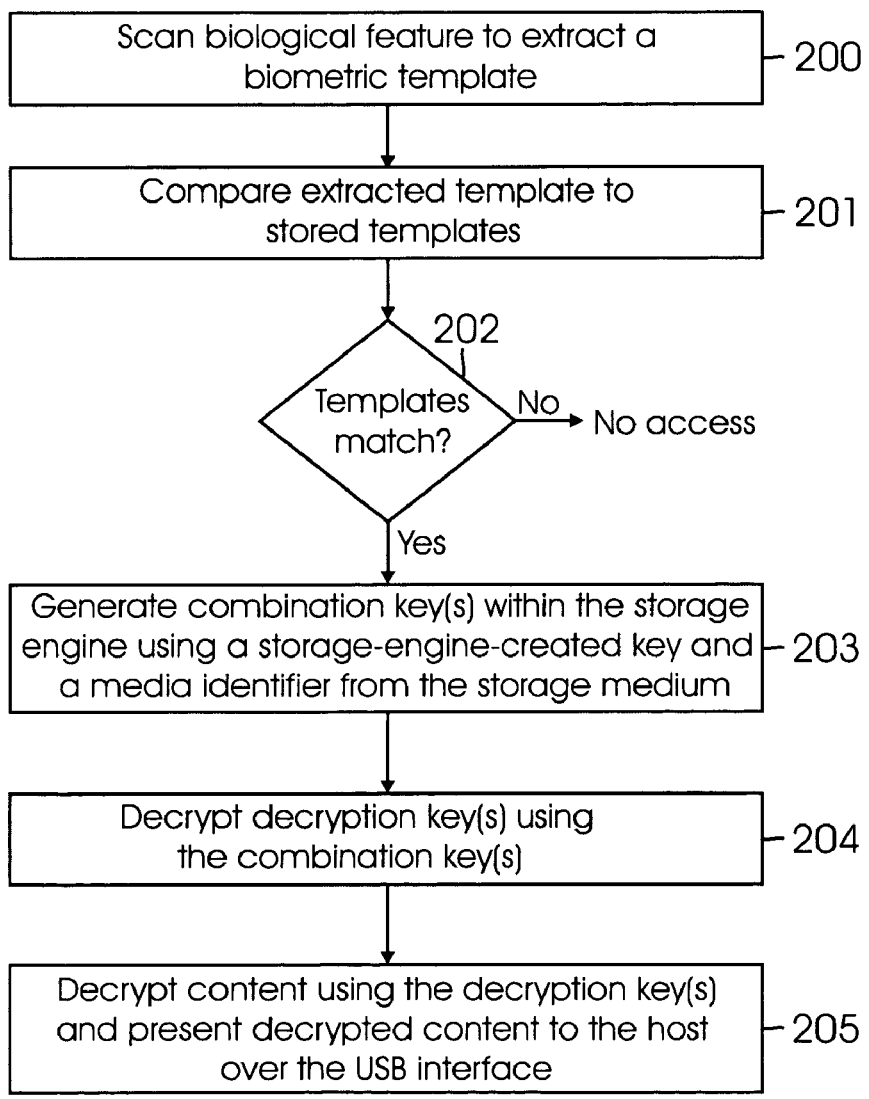
FIG. 2 is a flowchart illustrating a content access method practiced by a storage device with biometric access according to an embodiment of the invention.

Turning now to FIG. 2, an overview of access to an initialized storage medium is illustrated. In this example process, a user is seeking to read encrypted content on the storage medium but it will be appreciated that an analogous procedure may be followed for a user to write encrypted content to the storage medium. In step 200, the user scans a biological feature (such as a fingerprint) so that a biological template may be extracted from the resulting scanned data. In step 201, the storage device compares the extracted template to stored templates retrieved from the storage medium so that a match decision may be made in step 202. If a match is made, the storage engine generates a combination key(s) using a storage-engine-created key (such as a pseudo-random number) and a media identifier from the storage medium in step 203. Conversely, if no match is made, access is denied. In step 204, the encrypted decryption key(s) are retrieved from the metadata area of the storage medium and decrypted using the combination key(s). Finally, in step 205, the storage engine decrypts the content on the data area of the disk and presents it to the user. For example, a directory for content may be presented to the user at this time. It will be appreciated that steps 203 and 204 need not be subsequent to any match decision in that the encrypted biometric templates must also be retrieved from the disk and decrypted so that a match decision may be performed. In other words, the storage engine may generate the combination key(s) necessary to decrypt the decryption key(s) for the biometric templates and any content stored on the storage medium. The biometric templates and the content may then be decrypted using the decryption key(s) prior to any match decision. However, the user will not be able to access the content unless the extracted template matches one of the stored templates.

Having provided a matching template, a user may write files to the content portion of the storage medium using the file system recognized by the storage device. For example, if the recognized file system is FAT16, the user would write files to the storage medium under that protocol. The storage engine would encrypt the files using, e.g., triple-DES encryption keys. These encryption key(s) are then tied to the storage medium using a combination key(s) as discussed previously.

To provide greater storage flexibility, content on a storage medium may be partitioned such that a first group of users have access to a first group of files whereas another group of users have access to a second group of files on the storage medium. If a user in the first group provides a matching template, that user may read files from or add files to the first group. Similarly, if a user in the second group provides a matching template, that user may read files from or add files to the second group. The first and second group may have files in common or be completely unrelated.

The disk initialization process will now be discussed in more detail. Although a host PC needs no software modification to access storage media that are already initialized with biometric templates, a host PC that wishes to initialize a storage medium with biometric templates may practice an authentication procedure to establish a secure communication channel with the storage device. An exemplary authentication procedure is described in U.S. application Ser. No. 10/696,077, the contents of which are incorporated by reference. Regardless of the specific authentication procedure implemented, in these procedures a host must prove itself as authentic to the storage device and vice versa. After being authenticated, each device will be in possession of a "session key" which authorizes the exchange of protected content between the devices. In other words, the host must establish that it is a "trusted" device or application to the storage device. Similarly, the storage engine must establish trust with the host system. To be authorized to access secured digital content, each device (the host system and the storage device) must receive access permission from a certifying authority.

In one embodiment, this authentication process involves the use of public key cryptography. As is known in the cryptography arts, public key cryptography involves the use of public key/private key pairs. These key pairs are used to asymmetrically encrypt and decrypt messages. Each participant in the authentication process may freely let other participants know its public key. However, the private key for each participant is, as implied by the name, never disclosed to the other participants. The public keys are used for encryption whereas the private keys are used for decryption. A number of public key algorithms are known, however, a particularly convenient form of authentication is implemented using public key algorithms possessing a reflexive property. These reflexive public key algorithms include RSA (Rivest, Shamir, and Adelman) as well as ECC (elliptic curve cryptography). In a reflexive public key algorithm, if a message is encrypted using the public key and then decrypted using the corresponding private key or if the same message is decrypted using the private key and then encrypted using the public key, the same result is achieved, namely recovery of the message.

Useful authentication schemes may also use digital signatures. To generate a digital signature, a participant decrypts a code with its private key using a one-way hashing algorithm. One-way hashing algorithms are denoted as "one-way" because it is nearly impossible to uncover the original message (the private key) from the results (the digital signature) of the hashing algorithm. Because this private key is never revealed to other participants, the digital signature will be unique to the signing participant. Other participants may receive both the message and the digital signature. By processing (encrypting) the digital signature with the corresponding public key, these other participants will produce the message. After verifying that the produced message is the same as the message received with the digital signature, these other participants may be assured that the digital signature is genuine. Because the digital signature is produced with a private key, the digital signature will be unique to the signing party. Moreover, so long as the security of the private key is maintained by not disclosing it to others, the cryptographic algorithms used in conjunction with the digital signature protect against forgery.

Keeping these general principles of public key cryptography and digital signatures in mind, their implementation in one embodiment of a storage device with biometric access may now be described. This implementation will be described with respect to an ECC (elliptic curve cryptography) form of public key cryptography. It will be appreciated, however, that any suitable form of public key cryptography may be used such as the RSA algorithm. ECC cryptography has the useful feature that as the public key size is increased, the difficulty of deciphering the resulting encryption without the corresponding private key increases exponentially. In general, the computation complexity will also increase as the key size increases. ECC cryptography thus provides a convenient compromise between computational complexity and security.

In a public key cryptography system, each participant may receive the public key from another participant. Because these public keys are disseminated to other participants, a public key cryptography system needs some way to ensure that holders of public keys are authorized to possess them. As is known in the art, this assurance may be achieved through the use of digital certificates distributed by trusted third party known as the certifying authority. A holder of a public key will thus also possess a certificate. In the embodiments discussed herein, this certificate will contain a digital signature of the certifying authority to show that the holder of a public key is authorized to be in possession of it.

Figure 3:
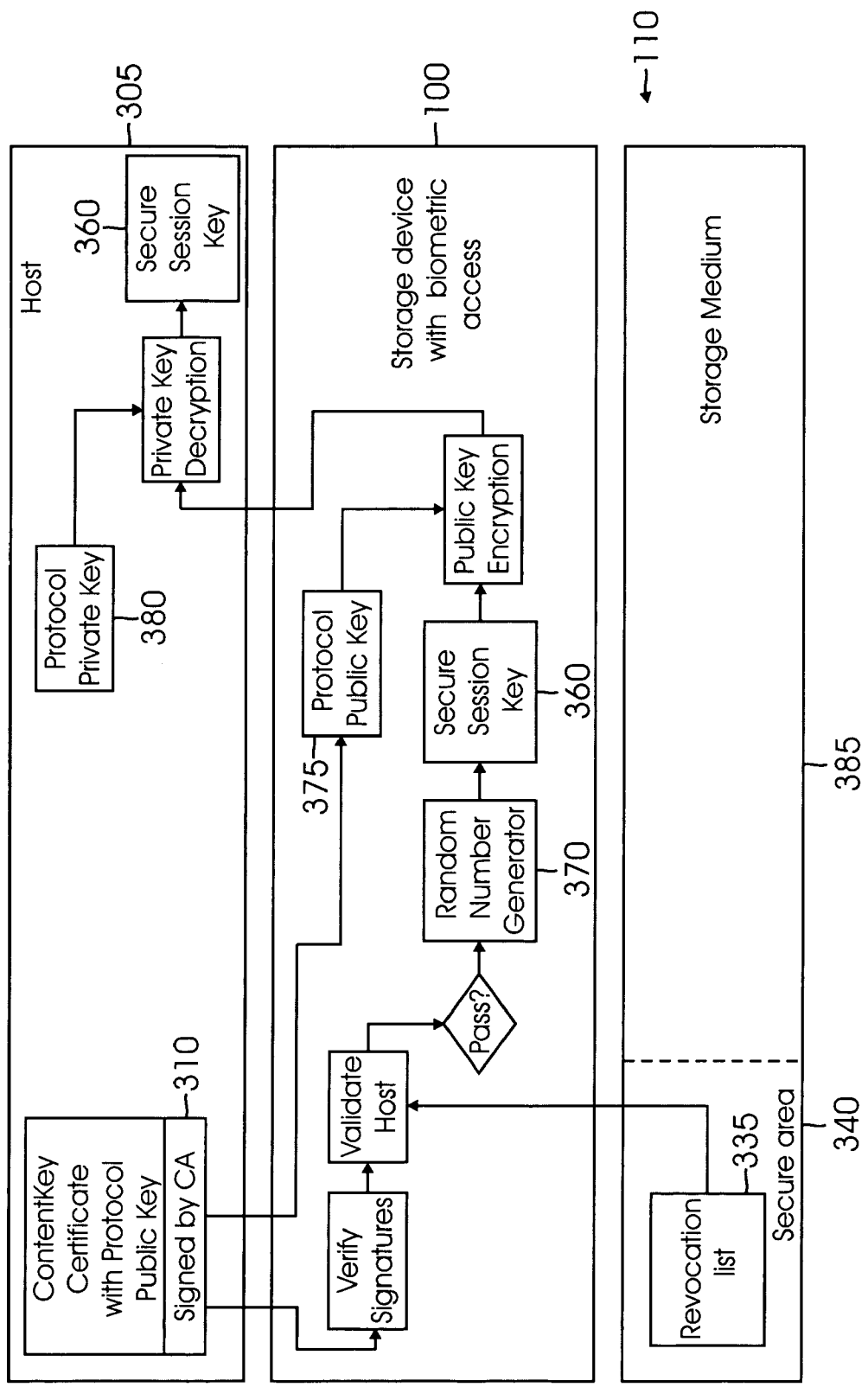
FIG. 3 is a block diagram for a host and an associated storage device with biometric access that illustrates a host authentication and verification process according to an embodiment of the invention

Turning now to FIG. 3, various stages in the authentication process and session key exchange between a host system 305 and storage device 100 (discussed with regard to FIG. 1) and storage medium 110 (also discussed with regard to FIG. 1). Before host system 305 can add or delete biometric templates on storage medium 110 in an initialization process, the host provides the storage device a digital signature 310 from a certifying authority (not illustrated). This digital signature represents a one-way hash of the certifying authority's private key. The storage verifies the digital signature with a corresponding public certifying authority key. Although the host may carry a valid digital signature from the certifying authority, certain events such as unauthorized access to protected content may lead to revocation of the rights afforded by the digital signature. To allow for such revocation, the storage medium may contain a revocation list 335 in a secure metadata area 340. The revocation list may be stored on the disc during the storage media manufacturing process or updated dynamically through vendor unique commands in the field. Each participant such as the storage engine and the host system may be assigned a unique ID number. The storage device checks the revocation list to verify that the ID number for the host is not on the list. Further details regarding an exemplary revocation process are provided in U.S. Ser. No. 09/940,026, the contents of which are hereby incorporated by reference.

If the host carries a valid digital signature and is not identified on the revocation list (if revocation capabilities are implemented), the storage device may proceed to generate a secure session key 360 using a random number generator 370. As discussed previously, the random number generator may be implemented using an LFSR driven by the second type of seed. Because the secure session key thus results from a random number generation, it will be unique to each "session" during which the host system writes biometric templates to the secure metadata area. Each participant in a public key security system may have its own public and private key pair. To write a biometric template to the metadata area, the host provides not only its digital signature but also its public key 375 (which may also be denoted as a "protocol public key"). Using the public key, the storage device encrypts the secure session key and transmits the encrypted key to the host. The host may then use a corresponding private key 380 to decrypt the transmission to recover the secure session key.

After the host system has been authenticated and has possession of the secure session key, the host system may begin to write biometric templates to the secure metadata area. In addition, desired content may be written to a content portion 385 of the storage medium at this time.

It will be appreciated that the authentication procedure just described may be altered to provide differing degrees of security. For example, after providing a digital signature, the host may prove possession of a secret or private key that is also common to the storage engine. During authentication, the storage engine may generate a random number that is encrypted, for example by AES encryption, using the shared secret key. This "random challenge" of the encrypted random number is then transmitted to the host. The host may then authenticate itself to the storage device by AES decrypting the random challenge using the shared key to recover the random number, which is then transmitted back to the storage device. In effect, the host simply proves possession of the shared private key by responding to the random challenge. The secure session key is generated by the storage engine using its (common) private key as discussed previously with regard to a genuinely private key. The host may then recover the secure session key using this common private key.

Referring again to FIG. 1, it will be appreciated that a fingerprint scanner component will generally be available already having the capability of determining a match between an extracted biometric template and a previously-stored biometric template. Thus, this component may be available in a discrete integrated circuit rather than being combined in one or more ASICs that implement the overall storage device functionality. In such a case, each biometric template or groups of the biometric templates may be associated with a proxy key. The host would then be configured to provide the proxy keys during initialization. For example, each biometric template may be provided as a "template record" that includes the biometric template as well as the associated proxy password. During initialization, the host provides the template record with the proxy encrypted according to the secure session key. For example, the proxy may be a 128-bit AES encrypted in this fashion. The storage device may then encrypt the received template record using, for example, triple-DES encryption before writing the encrypted template record to the secure metadata area of the storage medium (it will be appreciated that this secure area need not represent a physical sector or modification of the medium but simply be inaccessible to the host though the implemented file system as discussed previously). The proxy key may thus be doubly encrypted before being written to the storage medium. Because the storage engine will retrieve the proxy subsequent to the initialization, the storage engine will also write the AES key (or other type of key depending upon the encryption implemented in the host) to the metadata area. As discussed previously, this encryption key may be tied to the storage medium using the combination key scheme. If proxies are used, the storage device will provide itself the proxy associated with the matched biometric template. The host will then have access to whatever files are encrypted under this proxy.

In secure applications, an archival form of storage medium enhances the security features in that the stored data cannot be altered. One suitable archival storage medium is disclosed as disclosed in commonly-assigned U.S. Ser. No. 10/891,173, filed Jul. 13, 2004, which is a divisional application of U.S. Ser. No. 09/315,398, filed May 20, 1999, now abandoned, the contents of both applications being incorporated by reference herein in their entirety. In these first surface disks, an information layer covers a substrate, which may be formed to define one or both of a read-only and a writeable area. Advantageously, the information layer may be formed from a continuous phase-change material such as an SbInS alloy so that the formation of a read-only and writeable areas (if both exist) requires no masking or other complicated manufacturing processes. The surface of the information layer may be covered with an optical coupling layer formed from a dielectric such as silicon oxynitride. However, unlike a second surface disk, the optical coupling layer is quite thin (such as less than 100 nm) thereby providing no defocusing effect. Instead, it merely functions as an anti-reflective or optical coupling coating as known in the optical arts to better optically couple the information layer to an air-incident laser beam. Advantageously, the optical coupling layer does not introduce the aberrations and wave front distortions that the protective layer in second surface optical disks does such that the feature size may be substantially reduced. In this fashion, a significant data capacity is achieved despite the presence of a small form factor such as disk diameter of less than 35 mm.

The present assignee also developed a small form factor optical disk drive for use with the inventive first surface optical disks. For example, U.S. Ser. No. 09/950,378, filed Sep. 10, 2001, discloses an optical disk drive having an actuator arm with an optical pick-up unit (OPU) mounted on one end. The OPU includes a periscope having reflecting surfaces. The periscope is mounted on a transparent optical block. An object lens is positioned on spacers and mounted onto a quarter wave plate (QWP) which in turn is mounted on the periscope. The optical block is mounted through a turning mirror and a spacer to a silicon submount. A laser is mounted on a laser mount and positioned on a silicon substrate. Detectors are positioned and integrated onto the silicon substrate.

The actuator arm includes the OPU at one end. By rotating about a first axis through a spindle, the actuator arm may move the OPU radially with respect to an optical disk for tracking purposes. In addition, a distal portion of the actuator arm attaches to the remainder of the actuator arm by a second axis. Through rotation of the distal portion of the arm about this second axis, the OPU may move axially with respect to an optical disk to achieve a desired focus. By providing an actuator arm having these properties, a small form factor optical disk drive may be implemented. For example, the height of a disk drive incorporating OPU 103 may be as little as 10.5 mm.

Advantageously, a storage device 100 may thus have correspondingly small dimensions by using this small form factor optical disk drive as the storage engine. The first surface optical disks are also conveniently small yet provide secure and archival storage for surprisingly large amounts of data. Although this small form factor optical disk drive provides an advantageous implementation of storage device 100, it will be appreciated that other types of storage engines may be used as discussed previously.

To provide greater flexibility to a user, the host may be configured to allow import and export of the biometric templates. For example, a user may simply transport (through email, regular mail, or other transportation schemes) one or more biometric templates to another user. To ensure that the biometric template has not been tampered with, each user may be in possession of a shared secret key. The exporting user may then perform a one-way hash of the biometric template using the shared secret key and include the results of the one-way hash with the transported biometric templates. To ensure authenticity, a receiving user may then perform a one-way hash of the received biometric template using its shared secret key and compare the results of its self-generated one-way hash with that received with the biometric template. If the two hash results match, the recipient may be assured that the received biometric template is authentic.

In other embodiments, the host may download biometric templates from another host device or from a server on the Internet. To provide security in such transactions, an authenticated channel may be setup using a secure session key as discussed with regard to FIG. 3. Having established a secure authenticated channel, the peer host or Internet server may send the biometric templates encrypted according to the secure session key. The receiving host may then decrypt the secure-session-key-encrypted biometric templates with its secure session key so as to recover the biometric templates.

The above-described embodiments of the present invention are merely meant to be illustrative and not limiting. For example, the term "storage engine" will be understood to include the hardware necessary to read and write from the storage medium as well as the intelligence for the implementation of the digital rights management described herein. It will thus be obvious to those skilled in the art that various changes and modifications may be made without departing from this invention in its broader aspects. The appended claims encompass all such changes and modifications as fall within the true spirit and scope of this invention

What is claimed is:

1. A storage device with biometric access, comprising:
a biometric scanner adapted to scan a biological feature of a user to provide a corresponding extracted biometric template; and
a storage engine including a pseudo-random number generator, the storage engine adapted to decrypt encrypted content stored on a removable storage medium, wherein the encrypted content is encrypted according to at least one content key; the storage engine being adapted to perform the acts of: retrieve an encrypted biometric template from the removable storage medium and retrieve an encrypted content key from the removable storage medium; retrieve a media identifier from the storage medium; generate a first key using the pseudo-random number generator; generate a combination key by combining the first key with the retrieved media identifier; decrypt the encrypted content key using the combination key to recover the content key; decrypt the retrieved encrypted biometric template using the content key to recover a retrieved biometric template; and decrypt the encrypted content stored on the removable storage medium using the content key to allow a host device access the resulting decrypted content on the removable storage medium if the extracted biometric template matches the retrieved biometric template.

2. The storage device of claim 1, wherein the pseudo-random number generator is a linear feedback shift register.

3. The storage device of claim 2, further comprising a non-volatile memory to store a first seed for the linear feedback shift register, the linear feedback shift register being configured to use the seed to generate the first key such that the first key is a pseudo-random number.

4. The storage device of claim 1, wherein the biometric scanner is a fingerprint scanner.

5. The storage device of claim 1, wherein the biometric scanner is an iris scanner.

6. The storage device of claim 1, wherein the storage engine is an optical disk drive, the storage medium being a removable optical disk.

7. The storage device of claim 6, wherein the removable optical disk is a first-surface optical disk.

8. The storage device of claim 1, wherein the storage engine is a flash memory driver, the storage medium being a removable flash memory.

9. The storage device of claim 1, wherein the storage engine is a magnetic disk drive, the storage medium being a magnetic hard disk.

10. A method of biometric access, comprising:
- generating a first key using a pseudo-random number generator;
- combining the first key with a media identifier from a storage medium to create a combination key within a storage engine;
- encrypting a first biometric template with a content key;
- encrypting the content key with the combination key to generated an encrypted content key;
- writing the encrypted first biometric template and the encrypted content key to the storage medium using the storage engine;
- scanning a biometric feature with a biometric scanner to provide an extracted biometric template;
- retrieving the encrypted biometric template and the encrypted content key from the storage medium;
- decrypting the encrypted content key with the combination key to recover the content key;
- decrypting the encrypted biometric template with the recovered content key to recover the first biometric template; decrypting encrypted content stored on the storage medium using the recovered content key; and
- allowing a user access to the decrypted content on the storage medium if the extracted biometric template matches the first biometric template.

11. The method of claim 10, wherein generating the first key using the pseudo-random number generator comprises:
- retrieving a seed from a memory; and
- processing the seed through a linear feedback shift register to generate the first key.

12. The method of claim 10, further comprising:
- authenticating a first host device; and
- at the storage engine, receiving the first biometric template from the authenticated first host device.

13. The method of claim 12, wherein authenticating the first host device comprises determining whether the first host device possesses a private key.

14. The method of claim 13, wherein the private key is shared with the storage engine such that the private key is a shared private key.

15. The method of claim 14, wherein determining whether the first host device possesses the shared private key comprises encrypting a message with the shared private key and determining whether the first host device can recover the message.

16. The method of claim 12, further comprising:
- at a second host device, one-way hashing the first biometric template to provide a first one-way hash result;
- transmitting the first biometric template and the first one-way hash result from the second host device to the first host device;
- repeating the one-way hashing of the first biometric template at the first host device to provide a second one-way hash result; and
- comparing the first and second one-way hash results to determine whether the first biometric template is authentic.

17. The method of claim 16, wherein the second host device is a server.

18. The method of claim 16, wherein the second host device is a peer device.

* * * * *